United States Patent [19]

Michel

[11] Patent Number: 4,952,668

[45] Date of Patent: Aug. 28, 1990

[54] PROCESS FOR THE PRODUCTION OF POLYETHYLENETEREPHTHALATE FROM DIMETHYLTEREPHTHALATE

[75] Inventor: Robert E. Michel, Wilmington, N.C.

[73] Assignee: E. I. du Pont de Nemours and Company, Wilmington, Del.

[21] Appl. No.: 355,645

[22] Filed: May 22, 1989

[51] Int. Cl.$^5$ .............................................. C08G 63/78
[52] U.S. Cl. ..................... 528/272; 528/277; 528/308; 528/308.6; 528/502; 210/500.21
[58] Field of Search ............ 528/272, 277, 308, 308.6, 528/502; 210/500.21

[56] References Cited

U.S. PATENT DOCUMENTS

| | | | |
|---|---|---|---|
| 3,070,575 | 12/1962 | Cramer | 528/209 |
| 3,487,049 | 12/1969 | Busot | 526/65 |
| 3,551,386 | 6/1968 | Berkau et al. | 526/60 |

Primary Examiner—John Kight, III
Assistant Examiner—Sam A. Acquah

[57] ABSTRACT

A process for the removal of manganese catalyst from the bis glycol ester of terephthalic acid, by adding terephthalic acid and/or isophthalic acid, and separating the precipitate.

7 Claims, 1 Drawing Sheet

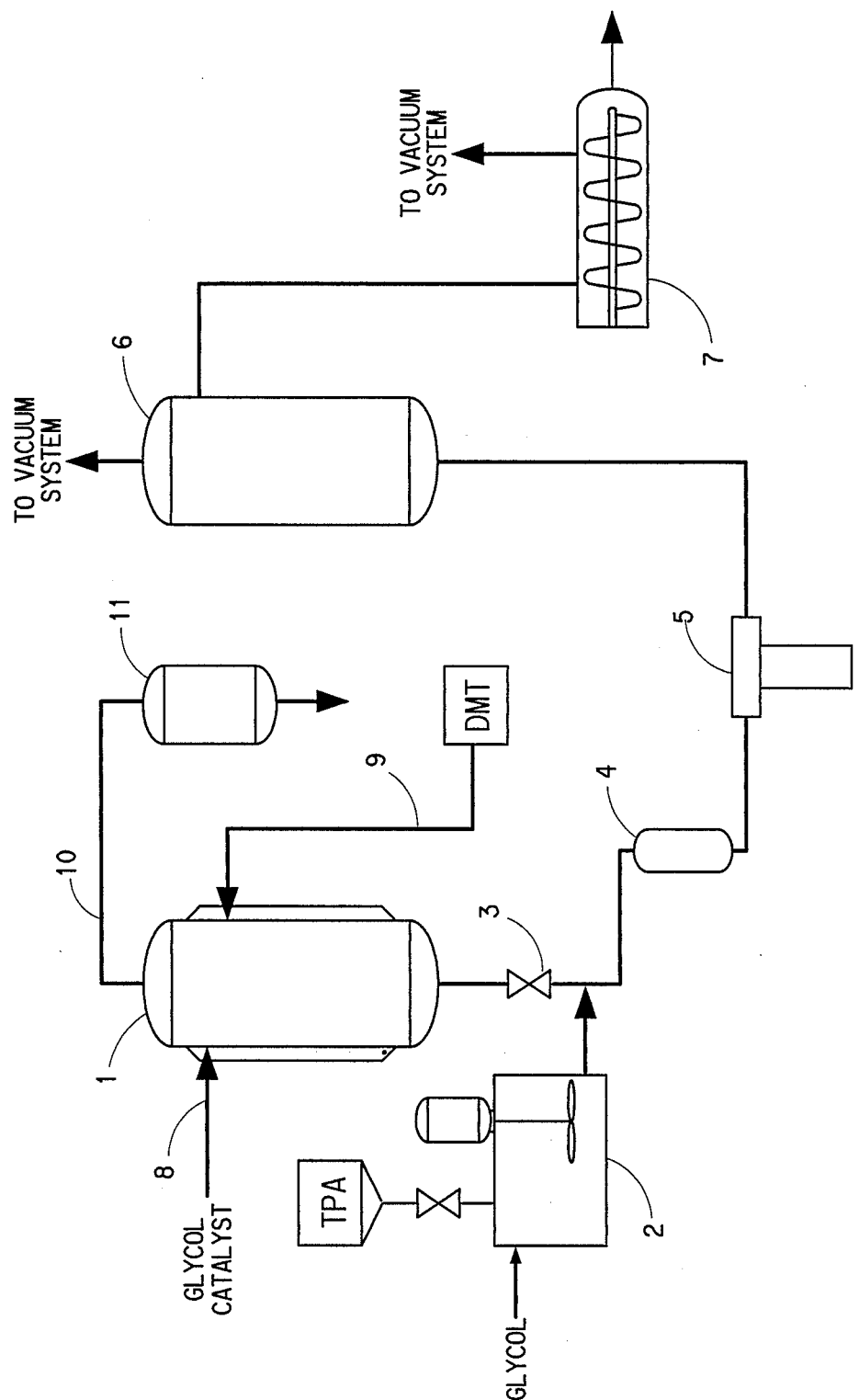

PROCESS FOR THE PRODUCTION OF POLYETHYLENETEREPHTHALATE FROM DIMETHYLTEREPHTHALATE

FIELD OF THE INVENTION

This invention relates to the production of high molecular weight polyethyleneterephthalate (PET) from dimethylterephthalate (DMT). More particularly this invention relates to the improvement in such production of the removal of the divalent manganese catalyst that is used in the formation of the bis glycol ester of terephthalic acid by the reaction of dimethylterephthalate and ethylene glycol, before polymerizing the ester product.

BACKGROUND OF THE INVENTION

High molecular weight PET can be produced by the reaction of dimethylterephthalate and ethylene glycol, to form the bis glycol ester of terephthalic acid, followed by the catalytic polymerization of this ester to high molecular weight product. It is conventional practice in the latter process to employ a divalent manganese catalyst to affect the reaction between the dimethylterephthalate and ethylene glycol. See Berkau, et al. U.S. Pat. No. 3,551,386, and Busot U.S. Pat. No. 3,487,049.

Cramer U.S. Pat. No. 3,070,575 shows in example II the addition of terephthalic acid (TPA) to a mixture of bis glycol ester of terephthalic acid and manganese catalyst. The amount of terephthalic acid added is over 1000 time the stoichiometric amount of manganese.

It is also known that this divalent catalyst if it remains unchanged in the final product, tends to color the product, and/or make it difficult to obtain a high molecular weight polymer. It is known to add phosphoric acid or other phosphorous compounds to the bis ester prior to polymerization in order to mitigate the color problem and the molecular weight problem.

SUMMARY OF THE INVENTION

It has now been found that the divalent manganese catalyst can be removed from the bis ester, by the addition of terephthalic acid and/or isophthatic acid. This addition causes the manganese compound to form a precipitate. The precipitate is probably the manganese salt of the acid. The precipitate can then be removed from the bis ester by physical means such as filtration, and the bis ester then polymerized in the conventional manner, such as by the use of antimony catalyst.

The amount of acid added should be at least about stoichiometrically equivalent to the amount of manganese present, and can be present in a moderate excess, for example, about twice the stoichiometric amount.

The manganese containing precipitate is somewhat soluble in the bis ester/glycol mixture at high temperatures, and accordingly it is desirable that the precipitate be removed at a temperature of less than about 190° C., and preferably at a temperature in the range of about 160° to 180° C.

DESCRIPTION OF THE DRAWING

The drawing is a flow sheet depicting a preferred method of practicing the process of the invention.

DETAILED DESCRIPTION

The bis glycol ester of terephthalic acid may be prepared by the catalyzed exchange of DMT with glycol under nitrogen. Usually the mole ratio of glycol to DMT is greater than 2 to 1 (glycol/DMT). The reaction may be carried out at elevated temperatures of about 185° to 210° C. A manganese catalyst such as manganese acetate is usually present in amounts of about 50 to 200 ppm based on the amount of DMT. Methanol is removed from the reactor until the theoretical amount is recovered.

Terephthalic acid and/or isophthatic acid is added. The mixture is then cooled to less than about 190° C. and the precipitate removed. A suitable method of removal is filtration. Any suitable filtration medium can be used. On the laboratory scale, glass filter paper is recommended. Since the particles of the precipitate are fine, the filter medium should be capable of removing particles as small as about 1.5 micron.

In the drawing, reactor 1 receives DMT by way of line 9, and a mixture of glycol and manganese catalyst by way of line 8. The DMT is preheated. Methanol is taken overhead by line 10 and collected in container 11. A mixture of terephthalic acid and/or isophthatic acid and ethylene glycol is produced in slurry-make-up mixer 2. This slurry is added to the bis ester product at injection nozzle 3. The bis ester, cooled after passing through heat exchanger 4, then passes through filter 5 where the precipitate is removed. The bis ester then passes to vessel 6 where a polymerization catalyst is added. Ethylene glycol is taken overhead, and the polymer then passes to extractor-extruder 7 where the molecular weight is raised to the desired level.

DETAILED EXAMPLES

The bis glycol ester of terephthalic acid was prepared by the manganese acetate (~100 ppm based on DMT) catalyzed exchange of DMT with glycol under nitrogen in a bath apparatus using a 2.2/1 mole ratio (ethylene glycol/DMT) at 190°-210° C. Heating was continued until the theoretical amount of methanol was collected.

Samples of the bis ester were heated to 220°-230° C. under nitrogen, TPA added, the mixture cooled to the filtration temperature and filtered through a glass filter paper of a 1.5 micron retention capacity. The filtrate was analyzed for manganese and polymerized. The results of these experiments are shown in the Table.

TABLE

Mn REMOVAL FROM MONOMER BY TPA ADDITION AND FILTRATION (1)

| RUN # | POLYMER BASE | % TPA | FILT. TEMP. | PPM Mn | POLYMER COLOR(2) | | | |
|---|---|---|---|---|---|---|---|---|
| | | | | | L | a | b | W |
| Control | DMT | 0 | 170 | 115 | 80.0 | +2.5 | +3.9 | 45 |
| 1 | DMT | 0.2 | 185 | 12 | 87.5 | −1.0 | +1.5 | 70 |
| 2 | DMT | 0.5 | 185 | 10 | 91.0 | −0.9 | +1.2 | 76 |
| 3 | DMT | 0.5 | 160 | <5 | These samples were not polymerized. | | | |
| 4 | DMT | 1.0 | 185 | 13 | | | | |
| 5 | DMT | 1.0 | 160 | 8 | | | | |
| 6 | DMT | 5.0 | 185 | 15 | | | | |
| 7 | DMT | 5.0 | 170 | <5 | 89.0 | −0.7 | +0.9 | 74 |
| 8 | DMT | 5.0 | 220 | 25 | 87.0 | −1.2 | +2.4 | 64 |

(1) Polymer colors are the average of at least three runs. The listings are for single experiments.
(2) Colors are based on the Hunter Scale where L is a measure of total reflected light, "b" is a measure of blueness(−) or yellowness (+) and "a" is a measure of redness(−) or greenness(+). W is a mathematical combination of L and b colors which is taken as a measure of overall whiteness; a value of 100 is pure white.

The data in the Table clearly show that TPA addition followed by filtration is an effective method for the removal of Mn from PET monomer.

What is claimed is:

1. In the process for the preparation of high molecular weight polyethylene terephthalate by the reaction of dimethylterephthalate and ethylene glycol to form the bis glycol ester of terephthalic acid and methanol using a divalent manganese catalyst said divalent manganese catalyst being present in the amount of about 50 to 200 parts per million based on the amount of dimethylterephthalate, followed by the polymerization of the bis glycol ester, the improvement which comprises precipitating the divalent manganese catalyst after formation of the bis glycol ester by the addition of terephthalic acid and/or isophthatic acid in an amount at least about stoichiometrically equivalent to the amount of manganese present, and removing the precipitate before polymerizing the bis glycol ester product.

2. The process of claim 1 in which the precipitate is removed by filtration at a temperature of less than about 190° C.

3. The process of claim 1 in which the manganese catalyst is manganese acetate.

4. The process of claim 1 in which methanol is removed from the system before the terephthalic acid is added.

5. The process of claim 1 in which the polymerization is by a condensation reaction with the elimination of ethylene glycol.

6. The process of claim 2 in which the filtration employs a glass filter paper having a 1.5 micron retention capacity.

7. The process of claim 1 in which the precipitate is removed by filtration at a temperature in the range of about 160° to 180° C.

* * * * *